Patented May 4, 1948

2,441,057

UNITED STATES PATENT OFFICE 2,441,057

POLYAMIDES

Theodore Le Sueur Cairns, Wilmington, Del., assignor to E. I. du Pont de Nemours & Company, Wilmington, Del., a corporation of Delaware No Drawing. Application October 18, 1944, Serial No. 559,252

7 Claims. (Cl. 260—72)

This invention relates to the field of synthetic linear polyamides and more particularly to the process for obtaining an improved N-alkoxymethyl polyamide.

This case is a continuation-in-part of my application Serial No. 507,745, filed October 26, 1943, now abandoned.

High molecular weight synthetic linear polyamides are a well known class of polymers of considerable commercial importance. They are usually prepared by the condensation of substantially equimolecular amounts of a diamine and a dibasic acid or an amino acid or mixtures of these compounds as has been described in United States Patents 2,071,250, 2,071,253 and 2,130,948. The polyamides of this kind, generally speaking, comprise the reaction product of a linear polymer-forming composition containing amide-forming groups, for example, reacting material consisting essentially of bifunctional molecules each containing two reactive groups which are complementary to reactive groups in other molecules and which include complementary amide-forming groups. These polyamides can be obtained by the methods given in the above mentioned patents and by other methods, for example, by self-polymerization of a monoamino-monocarboxylic acid, by reacting a diamine with a dibasic carboxylic acid in substantially equimolecular amounts, or by reacting a monoamino-monohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. These linear polyamides include also polymers, as for instance the polyester-amides, obtained by admixture of other linear polymer-forming reactants, as for instance glycol-dibasic acid mixtures or hydroxy acids, with the polyamide-forming reactants. The polymers of the above mentioned kind which are used in the practice of this invention, having an average number of carbon atoms of at least 2 separating the amide groups and are fiber-forming or high molecular weight products as evidenced by their intrinsic viscosity which is at least 0.4 as defined in the above-mentioned Patent 2,130,948.

Substantially all of the above described linear polyamides, as exemplified by the most valuable members, such as polyhexamethylene adipamide or polyhexamethylene sebacamide, or interpolyamides are insoluble in common organic solvents. a new class of nitrogen-substituted polyamide prepared from the above mentioned polyamides by treatment with formaldehyde and an alcohol in the presence of an oxygen containing acid have been found to produce polymers having many desirable properties, including solubility in such organic solvents as alcohol. This process has been described in my copending application Serial No. 445,635, filed June 3, 1942, now abandoned, in which the products obtained are shown to be N-alkoxymethyl polyamides, namely, polyamides of the above mentioned kind in which the functional groups

contained as an integral part of the polymer chain have been converted to groups of the formula

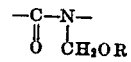

in which R is a hydrocarbon radical. The N-alkoxymethyl polyamides obtained by this process, that is, by treatment of a synthetic linear polyamide which has hydrogen bearing carbonamide groups with formaldehyde and an alcohol in the presence of an oxygen containing acid, usually have in addition to the N-alkoxymethyl group, some carbonamide groups which have undergone no change and also some which have N-methylol groups. The oxygen containing acid should have an ionization constant at least as great as $9.6 \times 10^{-6}$ and an equivalent conductance, measured at 25° C., in 0.01 N concentration, no greater than 370 ohms$^{-1}$ cm.$^2$. These N-alkoxymethyl polyamides have been found to have good solubility in many organic solvents. However, their application for many uses requiring good heat or melt stability, such as for calendering or injection molding, is not entirely satisfactory. Prolonged heat treatment of the polymers obtained in the manner described above such as in calendering or similar operations results in the formation of insoluble and infusible polymers. The reaction involved which gives rise to the insolubility and infusibility of these substituted polyamides is apparently one involving cross-linkage of the linear polyamide chains by means of the reactive N-methylol groups. The susceptibility of the N-alkoxymethyl polyamides as obtained by the above mentioned reaction to undergo this change thus precludes their use in many plastic applications.

It is an object of this invention to provide improved heat stable synthetic linear N-alkoxymethyl polyamides. A further object is to provide a process for the preparation of N-alkoxymethyl polyamides which possess improved melt stability. Other objects will appear hereinafter.

These objects are accomplished by the treatment of the previously described N-alkoxymethyl polyamides containing substantial amounts of N-methylol groups with a reagent chosen from the group consisting of alkali metal- or alkaline earth-hydroxides, carbonates, or sulfites.

The removal of the methylol group whose presence has been found to induce heat instability of the polyamide, can be readily carried out to obtain an N-alkoxymethyl polyamide of improved heat stability suitably by heating an aqueous slurry of the N-alkoxymethyl polyamide from which it is desired to remove N-methylol groups with an aqueous solution or suspension of an alkali metal- or alkaline earth-hydroxide, carbonate, or sulfite. After heating such a slurry at a temperature of up to 100° C. with the alkali metal- or alkaline earth-compound which may be present in quantities as low as 0.1% or less based on the total weight of the slurry for a period of approximately 5 to 10 minutes or longer, the polyamide is filtered and washed with water. The N-alkoxymethyl polyamide thus formed is found to be free of methylol groups. The methylol-free N-alkoxymethyl polyamide can be readily molded, calendered, or melt spun and in general the polymer thus possesses improved heat- and melt-stability.

This invention is further illustrated by the following examples in which the parts are by weight.

*Example I*

A slurry was prepared which consisted of 10 parts of water and 1 part of finely divided granular N-methoxymethyl polyhexamethylene adipamide formed by the action of formaldehyde and methanol on polyhexamethylene adipamide of intrinsic viscosity of about 1.0. To this vigorously stirred mixture there was added 0.01 part of sodium sulfite and the slurry heated at 60° C. for 30 minutes. The resulting modified polyamide was then filtered, washed thoroughly with water and the polyamide was then dried. This polyamide was found to contain no methylol groups after this treatment although initially it had a methylol content of 1.5%. The methoxyl content which was approximately 7.0% was essentially unchanged.

The dried methylol-free polyamide was found to be slightly less soluble in organic solvents and less sensitive to water than the original N-methoxymethyl polyamide. The polymer thus obtained was easier to mold and did not produce an insoluble infusible polymer upon heating at temperatures of about 200° C.

The initial N-methoxymethyl polyhexamethylene adipamide used in the above example was obtained by adding 1 part paraformaldehyde dissolved in 1.3 parts methanol to a solution of 1 part by weight polyhexamethylene adipamide in 3.7 parts formic acid and maintaining the mixture at 60° C. for 30 minutes when 0.3 part additional methanol was added. The reaction product was precipitated by pouring into a mixture of acetone and water.

*Example II*

One part of N-ethoxymethyl polyhexamethylene adipamide obtained with ethyl alcohol in a manner similar to that given above and having an ethoxyl content of 7.4% and a methylol content of 1.7% was added to 100 parts of water solution which contained 10 parts of sodium hydroxide. This mixture was stirred vigorously and heated at approximately 100° C. for 10 minutes. The modified polyamide was then filtered and washed thoroughly with water to remove all traces of alkali. The dried N-ethoxymethyl polyamide was then found to contain no methylol groups while the ethoxyl content was slightly increased. Although the original N-ethoxymethyl polyamide which contained methylol groups was not fusible when heated at 218° C. for 10 minutes, the alkali treated N-methylol-free polyamide fused readily at this temperature.

*Example III*

Ten parts of N-ethoxymethyl polyhexamethylene adipamide containing 0.26% methylol groups and 8.0% N-ethoxymethyl groups was heated one hour at 60° C. with a 1% aqueous suspension of calcium sulfite. After washing and drying the polymer, it was then found to contain only 0.03% methylol.

A further modification that has been found useful to improve the melt stability of the alkoxymethyl polyamide through the N-methylol removal has been to introduce the reagent effecting the removal of the N-methylol groups to the N-alkoxymethyl polyamide during milling or calendering of the polyamide. Such a treatment has been found to prevent insolubilization and to result in a polymer which does not set up to an infusible material upon repeated milling or calendering. This treatment is conveniently carried out by the addition of the reagent bringing about the removal of the N-methylol groups either in an aqueous solution or as a solid to the substituted polyamide to which water (in an amount roughly equivalent to the weight of polyamide) has been added. The milling of such a mixture is carried out for approximately one-half hour at temperatures of from room temperature to 100° C. The reagent effecting the removal of the N-methylol groups, e. g., sodium sulfite or sodium hydroxide, is customarily employed in this operation in amounts of about 10–20% by weight based on the weight of polyamide.

Alkali metal hydroxides, carbonates and sulfites are especially useful in the removal of the N-methylol groups. These include NaOH, $Na_2CO_3$, $Na_2SO_3$, KOH, $K_2CO_3$, $K_2SO_3$, and the corresponding lithium, rubidium and cesium compounds. The alkaline earth hydroxides, sulfites and carbonates, e. g., $Ca(OH)_2$, $Ba(OH)_2$, $Sr(OH)_2$, $CaSO_3$, $BaSO_3$ and $SrCO_3$ may also be used in the removal of the N-methylol groups by the method illustrated in the examples. It is preferred that the solubility of the alkali or alkaline earth compound be greater than 0.004 g. per 100 ml. of water at 20° C. It is also preferred that the reagents selected for removing the N-methylol groups have a pH of at least 7.5 as measured in a 1% aqueous solution or suspension. Quaternary ammonium hydroxides, amines, e. g., ethylamine, dimethylamine, etc., basic salts, such as $Na_3PO_4$, $Na_2S$, $Na_2B_4O_7$, and the alkaline earth compounds which are operable in this reaction usually require a longer reaction time to effect removal of N-methylol groups than for the alkali metal compounds. The amount of these materials can be varied within wide limits. Concentrations of from less than 0.1% to 10% or more of the hydroxides, sulfites, or carbonates in aqueous solution are usually used. These reagents when employed at temperatures of up to 100° C. for several hours have been found not to degrade the polymeric amide. This is to be contrasted to the use of mineral acids in dilute solutions such as phosphoric, sulfuric or hydrochloric to bring about the removal of N-methylol groups from the synthetic linear N-alkoxymethyl polyamide. When these latter reagents are used, the N-alkoxymethyl polyamide undergoes partial hydrolytic degradation and furthermore the N-alkoxymethyl group may be partially or completely removed along with the removal of the N-methylol groups.

With alkali metal hydroxides, carbonates or sulfites in aqueous solution, the time required for the removal of methylol groups is usually of the order of 5 to 10 minutes. The time required is somewhat dependent upon the temperature that is employed, temperatures such as 60° to 100° C. are usually employed although the removal of the methylol group may be effected at room temperature, namely, about 25° C., with somewhat greater time required for the reaction. Likewise higher temperatures can be used, although such temperatures are not preferred due to the increased rate of hydrolysis of the carbonamide linkages of the polyamide.

Thorough mixing of the slurry of the substituted polyamide with the aqueous solution of the reagent effective for the removal of the N-methylol groups can be conveniently carried out in a Werner and Pfleiderer mechanical mixer. Such mixing is particularly useful where slurries of polyamides which have a high ratio of N-substituents are used.

Although the use of water to prepare a slurry or suspension of the methylol containing N-alkoxymethyl polyamide is preferred, this removal of the methylol groups can be effected in alcoholic solution, particularly when a highly substituted N-alkoxymethyl polyamide, such as when 50% or more of the amide groups have substituents, is employed, in which case it is difficult to prepare a slurry or suspension of the polymeric material in water.

Furthermore, the N-methylol groups can be suitably removed from the N-alkoxymethyl polyamides containing N-methylol groups by adding the polymer directly to a bath containing substantial amounts of the hydroxide, carbonate, or sulfite. The basic materials first react to neutralize the acidic catalyst used in the N-alkoxymethyl polyamide preparation before removing the N-methylol groups.

The polyamides which have N-methylol groups that can be used in the practice of this invention are those derived from polyamides which have an intrinsic viscosity of at least 0.4. The preferred polyamides are the polycarbonamides. These include the polyureas, e. g., polydecamethyleneurea. Other polyamides can be used, however, but with somewhat less advantage in accomplishing the objects of the invention. These polyamides include the polysulfonamides (U. S. 2,321,890 and 2,321,891), e. g., the polysulfonamide derived from decamethylenediamine and m-benzenedisulfonylchloride in which sulfonamide there is a substantial amount of N-methylol groups present, can be used. Additional N-methylol containing polyamides that can also be used are those derived from polyurethanes and polythiourethanes, e. g., those derived from decamethylenediisocyanate and decamethyleneglycol (U. S. 2,284,637), polythionamides, e. g., polymers derived from polydecamethylenethiourea (U. S. 2,201,172), and from polyhydrazides, for example, that derived from hydrazine and sebacic acid.

The N-methylol-free N-alkoxymethyl polyamides of this invention can be used for coatings on fabric such as a leather substitute or as an adhesive in addition to such uses as for fibers, particularly as elastic fibers, films, or in molded articles. Particular advantage results in the employment of these polymers in calendering or in other operations such as in injection molding and melt spinning where exceptional heat stability is required. Pigments or other modifying agents are desirably added to the N-methylol-free polyamide for many uses. These alkoxymethyl polyamides are advantageously used, with or without added dyes or pigments, in such applications as shoe soles, wrist watch straps, belts, suspenders, etc.

As many apparently widely different embodiments of this invention may be made without departing from the spirit and scope thereof, it is to be understood that I do not limit myself to the specific embodiments thereof except as defined in the appended claims.

I claim:
1. A process for removing N-methylol groups from an N-alkoxymethyl polycarbonamide containing such groups, said process comprising reacting said N-alkoxymethyl polycarbonamide at a temperature of from 25° C. to 100° C. with a member of the group consisting of alkali metal hydroxides, carbonates and sulfites and alkaline earth hydroxides, carbonates and sulfites, and continuing the reaction until said N-alkoxymethyl polycarbonamide is substantially free from methylol groups, said N-alkoxymethyl polycarbonamide being the polymer obtained by converting amide groups

in the polymer chain of a synthetic linear polycarbonamide, which has an intrinsic viscosity of at least 0.4 and in which the average number of carbon atoms separating said amide groups is at least two, to groups of the formula

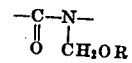

wherein OR is an alkoxy group.

2. A process for removing N-methylol groups from an N-alkoxymethyl polycarbonamide containing such groups, said process comprising heating at a temperature of from 60° C. to 100° C. an aqueous slurry of said N-alkoxymethyl polycarbonamide with a member of the group consisting of alkali metal hydroxides, carbonates and sulfites, and alkaline earth hydroxides, carbonates, and sulfites, and continuing the heating until said N-alkoxymethyl polycarbonamide is substantially free from methylol groups, said N-alkoxymethyl polycarbonamide being the polymer obtained by converting amide groups

in the polymer chain of a synthetic linear polycarbonamide, which has an intrinsic viscosity of at least 0.4 and in which the average number of carbon atoms separating said amide groups is at least two, to groups of the formula

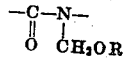

wherein OR is an alkoxy group.

3. A process for removing N-methylol groups from an N-alkoxymethyl polycarbonamide containing such groups, said process comprising heating at a temperature of from 60° C. to 100° C. an alcoholic solution of said N-alkoxymethyl polycarbonamide with a member of the group consisting of alkali metal hydroxides, carbonates and sulfites, and alkaline earth hydroxides, carbonates, and sulfites, and continuing the heating until said N-alkoxymethyl polycarbonamide is substantially free from methylol groups, said N-alkoxymethyl polycarbonamide being the polymer obtained by converting amide groups

in the polymer chain of a synthetic linear polycarbonamide, which has an intrinsic viscosity of at least 0.4 and in which the average number of carbon atoms separating said amide groups is at least two, to groups of the formula

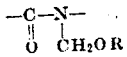

wherein OR is an alkoxy group.

4. The process set forth in claim 1 in which said compound is an alkali metal hydroxide.

5. The process set forth in claim 1 in which said compound is an alkali metal carbonate.

6. The process set forth in claim 1 in which said compound is an alkali metal sulfite.

7. The process set forth in claim 1 in which said compound is sodium sulfite.

THEODORE LE SUEUR CAIRNS.

REFERENCES CITED

The following references are of record in the file of this patent:

UNITED STATES PATENTS

| Number | Name | Date |
|---|---|---|
| 2,201,741 | Owens et al. | May 21, 1940 |
| 2,244,184 | Austin et al. | June 3, 1941 |
| 2,286,752 | Mighton | June 16, 1942 |